Figure 1:
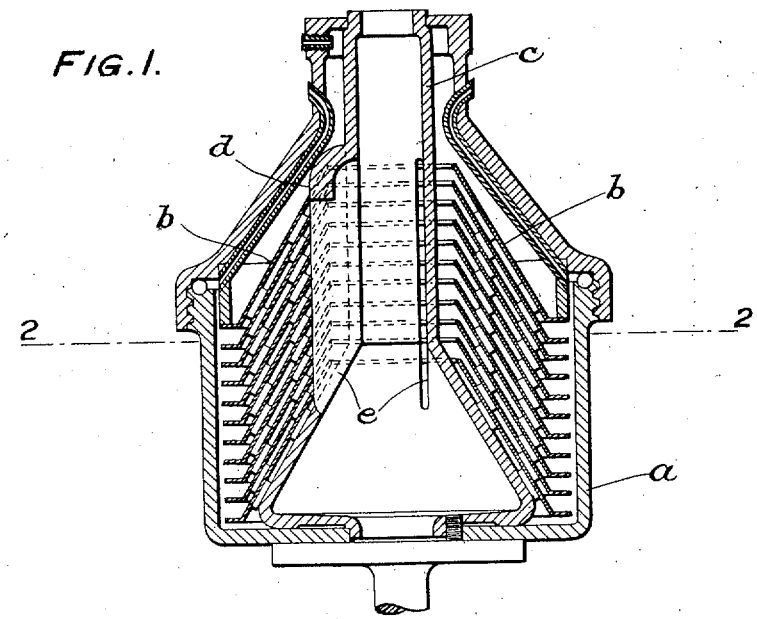

B. R. WRIGHT.
CENTRIFUGAL LIQUID SEPARATOR.
APPLICATION FILED JUNE 23, 1908.

989,099.

Patented Apr. 11, 1911.

WITNESSES:

INVENTOR
Bert R. Wright

BY
ATTORNEYS.

UNITED STATES PATENT OFFICE.

BERT R. WRIGHT, OF POUGHKEEPSIE, NEW YORK, ASSIGNOR TO THE DE LAVAL SEPARATOR COMPANY, A CORPORATION OF NEW JERSEY.

CENTRIFUGAL LIQUID-SEPARATOR.

989,099.  Specification of Letters Patent. Patented Apr. 11, 1911.

Application filed June 23, 1908. Serial No. 439,892.

*To all whom it may concern:*

Be it known that I, BERT R. WRIGHT, a citizen of the United States, residing at Poughkeepsie, county of Dutchess, and State of New York, have invented a new and useful Improvement in Centrifugal Liquid-Separators, of which the following is a full, clear, and exact description, reference being had to the accompanying drawings, which form a part of this specification.

My invention relates to certain improvements in delivering the full milk from the central feed pipe to insure the maximum quantity of delivery with a given sized central feed pipe.

The central feed pipe for practical purposes is required to be of small size, in order to occupy a small space in the bowl and in order to enable the delivery of the cream to be well in toward the center of the bowl. Moreover, in ordinary construction the interior of the feed pipe is usually made round and smooth or nearly so for convenience of manufacture and cleaning. In these circumstances the milk fed into the central feed pipe for distribution into the separating space of the bowl usually partakes in but small degree of the revolving speed of the bowl, so that the amount fed through the slots or other openings of the feed pipe is chiefly due to the head and pressure of the liquid from the supply receptacle and is considerably less than the bowl is capable of separating, and if it is attempted to increase the supply the incoming milk will frequently flood the central feed pipe, flowing over the top of said pipe.

In the ordinary construction now in use where slots or other openings from the feed pipe are used the walls of the slots or openings are substantially radial. I believe Letters Patent designed to cover other purposes have been issued which have incidentally shown slots or openings leaving the feed pipe obliquely or in a curved direction, but not tangential. My experiments have included tests of such oblique and curved openings (not tangential) with no advantage, and in some cases decided disadvantage, as compared with radial slots or openings. Especially have I found this to be true where the slots or openings were forwardly instead of rearwardly inclined with respect to the revolving direction of the bowl.

I have discovered, after considerable working, that a much greater relative feeding capacity is accomplished through the central feed pipe by having the forward wall of the slot or other form of opening in the feed pipe, with reference to the direction in which the bowl is revolving, tangential with the inner wall or surface of the feed pipe at the point of leaving the pipe, in which manner, as the pipe revolves around the milk contained within it, there is a freer out-flow of the milk through the slot or opening, and the milk within the pipe is at same time caused to more largely partake of the revolving speed of the pipe and its discharge therefrom into the separating space of the bowl is thereby still further facilitated. The preferred form of construction as shown requires that the direction of the discharge as the milk leaves the feed pipe be rearwardly with respect to the direction in which the bowl is revolving. The term tangential, as used, is intended to mean that the forward wall, if prolonged, will not pass through the wall of the tube. Also when the term tangential is used in the specification and claims it is intended to include only precisely tangential.

I will now describe an embodiment of my invention illustrated in the accompanying drawings in which—

Figure 2:
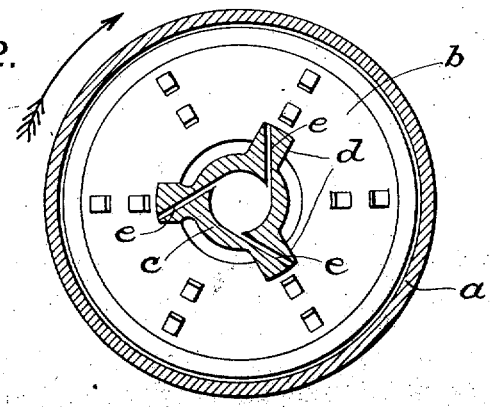

Figure 1 is a vertical section through a centrifugal separator embodying my invention. Fig. 2 is a cross-section on the line 2—2 Fig. 1.

*a* is the separator bowl, provided with superimposed inclined plates *b*.

*c* is the central feed pipe provided with projecting wings *d*. Each of these wings has a slot cut through it. The forward wall *e* of each slot is, at its inner end, tangential to the feed pipe and inclined rearwardly with respect to the direction of rotation of the bowl (indicated by the arrow). As shown, the wall *e* continues in a straight line to the outer end of the slot. The outer end of the slots open into the spaces between the plates. When I use the term "forward wall," I mean the forward wall with respect to the direction of rotation of the bowl.

My invention relates to the point where the full milk leaves the central feed pipe and not necessarily the point where it enters the separating space of the bowl.

Having now fully described my invention, what I claim and desire to protect by Letters Patent is:

1. In a centrifugal liquid separator, the combination with the rotating bowl, of a central feed pipe adapted to receive the liquid to be separated, and means to cause said liquid to leave the feed pipe in a direction tangential with respect to the feed pipe.

2. In a centrifugal liquid separator, the combination with the rotating bowl, of a central feed pipe adapted to receive the liquid to be separated, and means to cause said liquid to leave the feed pipe in a direction rearwardly with respect to the direction of rotation of the bowl and tangential to the feed pipe.

3. In a centrifugal liquid separator, the combination with the rotating bowl, of a central feed pipe having outlets, the inner ends of the forward walls of said outlets being tangential to the feed pipe.

4. In a centrifugal liquid separator, the combination with the rotating bowl, of a central feed pipe having outlets, the inner ends of the forward walls of said outlets being in directions rearwardly with respect to the direction of rotation of the bowl and tangential to the feed pipe.

5. In a centrifugal liquid separator, the combination with the rotating bowl, of a central feed pipe having an outlet, the inner end of the forward wall of said outlet being tangential to the feed pipe.

6. In a centrifugal liquid separator, the combination with the rotating bowl, of a central feed pipe, slotted wings projecting therefrom, the inner ends of the forward walls of said slots being tangential to the central feed pipe.

7. In a centrifugal liquid separator, the combination with the rotating bowl, of a central feed pipe, slotted wings projecting therefrom, the inner ends of the forward walls of said slots inclining rearwardly with respect to the direction of rotation of the bowl and tangential to said feed pipe.

8. In a centrifugal liquid separator, the combination with the rotating bowl having plates therein, of a central feed pipe, slotted wings projecting therefrom, the inner ends of the forward walls of said slots being tangential to the central feed pipe, the outer end of said slot opening into the space between the plates.

9. In a centrifugal liquid separator, the combination with the rotating bowl having plates therein, of a central feed pipe, slotted wings projecting therefrom, the inner ends of the forward walls of said slots inclining rearwardly with respect to the direction of rotation of the bowl, and being tangential to said feed pipe at said point, the outer end of said slot opening into the space between said plates.

In testimony of which invention, I have hereunto set my hand, at Poughkeepsie, on this 6th day of June, 1908.

BERT R. WRIGHT.

Witnesses:
 GEORGE E. REDFIELD,
 HENRY KRIEGER.